United States Patent
Morhart et al.

(10) Patent No.: US 10,595,220 B2
(45) Date of Patent: Mar. 17, 2020

(54) VEHICLE COMMUNICATION MODULE AND DIAGNOSTIC DEVICE AND METHOD FOR TESTING THEREOF

(71) Applicants: CONTINENTAL AUTOMOTIVE GMBH, Hannover (DE); Continental Teves AG & Co. oHG, Frankfurt (DE)

(72) Inventors: Christian Morhart, Köfering (DE); Marc Menzel, Weimar (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 15/927,364

(22) Filed: Mar. 21, 2018

(65) Prior Publication Data
US 2018/0279141 A1  Sep. 27, 2018

(30) Foreign Application Priority Data
Mar. 21, 2017 (DE) .......... 10 2017 204 739

(51) Int. Cl.
| | | |
|---|---|---|
| *H04W 24/06* | (2009.01) | |
| *H04B 17/318* | (2015.01) | |
| *H04B 17/17* | (2015.01) | |
| *H04W 4/40* | (2018.01) | |
| *H04L 1/24* | (2006.01) | |

(52) U.S. Cl.
CPC ............ *H04W 24/06* (2013.01); *H04B 17/17* (2015.01); *H04B 17/318* (2015.01); *H04L 1/241* (2013.01); *H04L 1/243* (2013.01); *H04L 1/244* (2013.01); *H04W 4/40* (2018.02)

(58) Field of Classification Search
None
See application file for complete search history.

(56) References Cited

U.S. PATENT DOCUMENTS

| | | |
|---|---|---|
| 5,016,020 A | 5/1991 | Simpson |
| 9,379,828 B2 | 6/2016 | Banasky, Jr. |
| 2004/0038678 A1* | 2/2004 | Lescuyer ............ H04W 24/00 455/424 |
| 2016/0134383 A1* | 5/2016 | Banasky, Jr. ......... H04B 1/40 455/67.14 |
| 2016/0254870 A1* | 9/2016 | O'Keeffe .............. H01Q 21/24 455/67.14 |
| 2016/0366598 A1* | 12/2016 | Gallagher ............ G08G 1/161 |
| 2017/0034021 A1 | 2/2017 | Petrucci et al. |
| 2017/0070320 A1 | 3/2017 | Choi et al. |

(Continued)

FOREIGN PATENT DOCUMENTS

KR    10201000765    7/2010

OTHER PUBLICATIONS

Bansal, Gaurav, et al., Cross-Validation of DSRC Radio Testbed and NS-2 Simulation Platform for Vehicular Safety Communications, 2011.

(Continued)

*Primary Examiner* — Mohammad S Adhami

(57) ABSTRACT

A method for testing a vehicle-to-X communication module by means of a diagnostic device as well as an associated vehicle-to-X communication module and an associated diagnostic device. During a test mode messages are exchanged between the vehicle-to-X communication module and the diagnostic device, and evaluated in order to detect errors.

17 Claims, 1 Drawing Sheet

(56) References Cited

U.S. PATENT DOCUMENTS

2018/0138966 A1* 5/2018 Ishiko .................. H04B 7/1555

OTHER PUBLICATIONS

Bansal, Gaurav, et al., Cross-Validation of DSRC Radio Testbed and NS-2 Simulation Platform for Vehicular Safe Communications, 2011.

Chih-Neng Liang, et all, A Study of DSRC Jammer in Vehicle Safety Application Testbed, 20as 12th International Conference on ITS Telecommunications, 2012, pp. 216-219.

German Search Report dated Oct. 19, 2017 for corresponding German Patent Application No. 10 2017 204 739.9.

* cited by examiner

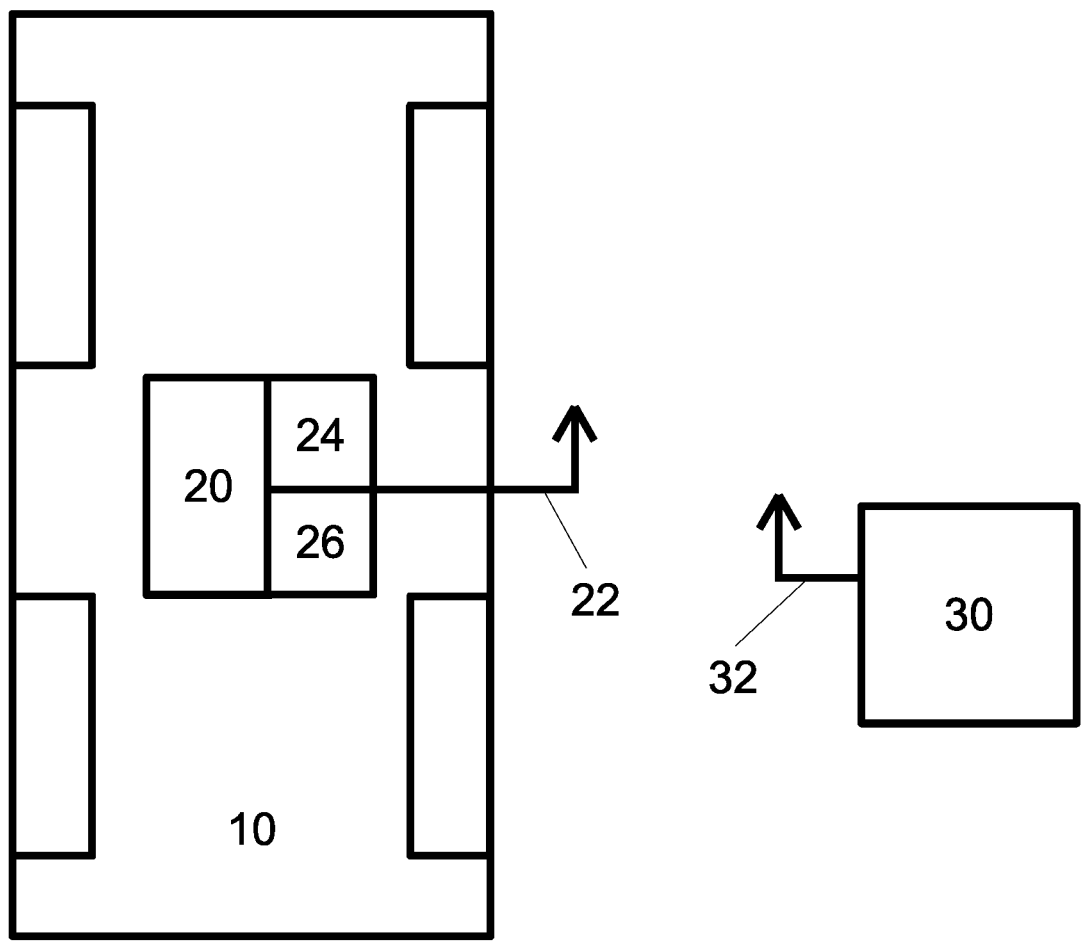

VEHICLE COMMUNICATION MODULE AND DIAGNOSTIC DEVICE AND METHOD FOR TESTING THEREOF

CROSS-REFERENCE TO RELATED APPLICATIONS

The This U.S. patent application claims the benefit of German patent application No. 10 2017 204 739.9, filed Mar. 21, 2017, which is hereby incorporated by reference.

TECHNICAL FIELD

The invention relates to a method for testing a vehicle communication module and an associated diagnostic device.

BACKGROUND

Vehicle-to-X communication modules, also referred to as Electronic Control Units (ECU), typically comply with the standards of ETSI, SAE or IEEE. Typical frequencies at which vehicle-to-X communication modules operate radio communications are, by way of example, 5.9 GHz (in particular in Europe) or 700 MHz (in particular in Japan).

Vehicle-to-X communication will assume an important role in future vehicles in terms of the safety of the vehicle. Accordingly, it is important to detect errors in a vehicle-to-X system, in order to be able to react accordingly if necessary.

However, not all tests can be performed solely by a vehicle-to-X communication module. For example, typical chipsets cannot transmit and receive simultaneously, as a result of which a complete system test including cables and antennae cannot be performed. Errors such as too low a range cannot therefore be located.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for testing a vehicle-to-X communication module makes a more extensive error check. It, in addition, provides an associated vehicle-to-X communication module as well as an associated diagnostic device.

A first aspect of a method for testing a vehicle-to-X communication module comprises, placing the vehicle-to-X communication module in a test mode, emitting a number of test messages by means of the vehicle-to-X communication module during the test mode, receiving the test messages by means of a diagnostic device, and analyzing the test messages by means of the diagnostic device and, based thereon, detecting errors of the vehicle-to-X communication module.

The vehicle-to-X communication module can be placed in a special test mode, which test mode can be performed, by way of example, in the form of a workshop test. Test messages emitted in the process can be received by means of the diagnostic device and checked for errors or for signs of errors.

An error of a transmitting amplifier or of an antenna cable between the vehicle-to-X communication module and a vehicle antenna may be detected, if a field strength of the received test messages is below a threshold. In this case, typical errors in transmitting amplifiers or antenna cables, which are used to transmit vehicle-to-X messages from a vehicle, may be reliably detected.

A second aspect of a method for testing a vehicle-to-X communication module has the following steps: placing the vehicle-to-X communication module in a test mode, emitting a number of test messages by means of a diagnostic device during the test mode, receiving the test messages by means of the vehicle-to-X communication module, analyzing the test messages by means of the vehicle-to-X communication module and, based thereon, detecting errors of the vehicle-to-X communication module.

In the case of the second aspect, the procedure is reversed compared with the method of the first aspect. Test messages are now no longer emitted by means of the vehicle-to-X communication module, but rather the diagnostic device emits the test messages, and the vehicle-to-X communication module receives these. In this case, it is possible to search for errors or for signs of errors in a similar manner.

An error of a receiving amplifier or of an antenna cable between the vehicle-to-X communication module and a vehicle antenna may be detected, if a field strength of the received test messages is below a threshold. Such errors can therefore be detected on the basis of a reliable characteristic.

It should be indicated that the term "error" of a vehicle-to-X communication module may be understood to be very broad here and, in particular, may also include errors of surrounding or supporting components such as, by way of example, antenna cables or antennae.

The following embodiments typically refer to both aspects.

A plurality of test messages may be emitted during the test mode. Differing tests can be performed with these, by way of example. Detected errors can also be verified in that they are only detected as being relevant if they have been detected in multiple messages.

The test messages may be emitted with a predefined frequency. This frequency refers to purely the emission of the test messages, but not to a high-frequency signal used for the transmission. By way of example, the test messages can be emitted with a frequency between 15 Hz and 25 Hz, in particular 20 Hz. Such values have proven to be advantageous for typical applications.

The test messages may be transmitted with differing power. As a result, tests may be in particular be performed to establish whether differing transmitting powers also result in differing receiving strengths.

Errors in a power regulation may be detected based on the measured powers of received test messages. By way of example, such an error can be detected in a power regulation, if test messages having differing power do not result in differing received field strengths, or if received field strengths otherwise deviate from predefined values or the ranges to be expected.

Accordingly, transmit spectral masks may be created from the received test messages and, as a function thereof, errors in a radio chip are detected. Various typical errors in radio chips can be detected by means of such transmit spectral masks.

Packet error rates, modulation, data rates and/or packet contents of the received test messages may be analyzed and, as a function thereof, an error in a radio chip is detected. These are typical parameters which can indicate errors in a radio chip.

Detected errors may be emitted to the diagnostic device, to vehicle electronics, to a display or to an external device. A user, for example a technician in a workshop, can therefore be informed, by way of example, of the error. Likewise, the corresponding error message can, by way of example, be forwarded to a vehicle manufacturer or to a component manufacturer.

Accordingly, the diagnostic device uses an antenna executed as a hood over a vehicle antenna in order to receive and/or transmit test messages. This can prevent test messages being emitted over a larger spatial extent and, therefore, possibly interfering with the vehicle-to-X communication of vehicles located in the vicinity.

The test messages may be identified by a message format deviating from standard vehicle-to-X messages, by way of example operational vehicle-to-X messages. This can be effected, by way of example, by means of a modified EtherType or a modified BTP port or by means of predefined security certificates. As a result, the test messages required for the method used here can be identified in such a manner that that they can be clearly recognized as test messages from other vehicle-to-X communication modules, so that they do not have to be checked for relevant content and do not result in interference with the operational vehicle-to-X communication.

Accordingly, messages which have already been received or transmitted independently of the test mode can also be used as test messages. Consequently, standard operational vehicle-to-X messages can be used as test messages. In this case, transmitting the messages again does not typically result in interference with the operational vehicle-to-X communication, since the system can handle such repeated emissions.

In addition, the invention relates to a vehicle-to-X communication module which is configured to execute a method according to the first aspect. In addition, a diagnostic device may be configured to execute a method according to the second aspect. With respect to the two methods, i.e. according to the first aspect and the second aspect, recourse can be had in each case to all of the embodiments and variants described herein.

In addition, a non-volatile computer-readable storage medium contains program code. On running the program code, a method according to the invention is executed. With respect to the method, recourse can be had to all of the embodiments and variants described herein.

A diagnostic device can have a calibrated antenna. The measurements of relevance here can therefore be executed with a high level of precision and reliability.

It should be indicated in general that test systems, by way of example such as those described herein, can be used, for instance, to locate and isolate errors in a high-frequency (HF) communication path, in order to be able to specifically exchange defective parts. This can be, by way of example, an antenna, a cable or an ECU.

To this end, the following test steps can, by way of example, be performed: Place ECU in a "Transmit test mode". As a result, the ECU emits predefined test packets with a frequency (for example, 20 Hz) which can be received by the test device via a calibrated antenna, and evaluated. Also, the test device evaluates the signals, wherein the received field strength reveals whether the HF amplifier (PA=Power Amplifier) is still providing full power, and cables and antennae still have the original HF properties (loss or respectively gain, polarization, etc.). Furthermore, the packet error rates, the modulation, the data rates and the packet contents can be checked, by way of example, in order to locate errors in the radio chip. The results of the statistical analysis of the individual parameters are emitted by the test device. This can be effected, by way of example, on the device's own display or via an interface with a connected diagnostic device.

Optionally, the ECU transmits packets with differing transmitting power, in order to locate errors in the power regulation. Also optionally, the test device checks compliance with the transmit spectral mask, in order to locate errors in the radio chip. This test requires a particular test device.

Further, the ECU is placed in a "Receive test mode". In this case, the roles of the test device and ECU are reversed. The ECU analyzes test packets of the test device and forwards the results to the diagnostic device.

The test device emits predefined test packets with a certain frequency (for example 20 Hz), and does so via a calibrated antenna, which test packets can be received by the ECU via the vehicle antenna, and evaluated.

The ECU evaluates the signals, wherein the received field strength reveals whether the HF amplifier (LNA=Low Noise Amplifier) is still providing full power, and cables and antenna still have the original HF properties (loss or respectively gain). Furthermore, the packet error rates, the modulation, the data rates and the packet contents can be checked, in order to locate errors in the radio chip. The results of the statistical analysis of the individual parameters can be emitted to the diagnostic device, for example via UDP.

Optionally, the test device emits packets with differing transmitting power, in order to locate errors in the received power regulation.

A calibrated antenna or other antenna of the test device can be executed as a hood such that the test signals do not penetrate outwardly and interfere with other vehicle-to-X communication systems.

In order to distinguish the test packets from other vehicle-to-X packets, these can be identified by means of a special message format (for example, modified EtherType or modified BTP port) or by means of special security certificates. However, the test can also be performed with unmodified messages which are simply emitted again. The special test messages provide greater freedom in terms of their length and content, and errors can thus be better provoked.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The person skilled in the art will infer further features and advantages from the embodiment example which is described below with reference to the appended drawing, wherein:

FIG. 1 shows a vehicle as well as a diagnostic device.

DETAILED DESCRIPTION

FIG. 1 merely shows schematically a vehicle 10 as well as a diagnostic device 30.

The vehicle 10 has a vehicle-to-X communication module 20. The vehicle-to-X communication module 20 is connected to a first antenna 22 which is mounted externally on the vehicle 10.

In order to transmit vehicle-to-X messages, the vehicle-to-X communication module has a transmitting amplifier 24. In order to receive vehicle-to-X messages, the vehicle-to-X communication module 20 has a receiving amplifier 26. These are respectively connected to the first antenna 22 so that the vehicle-to-X communication module 20 can provide the functionality of vehicle-to-X communication for the vehicle 10 by means of the two amplifiers 24, 26 and the antenna 22.

The diagnostic device 30 has a second antenna 32. Consequently, it is also possible for the diagnostic device 30 to transmit and receive vehicle-to-X messages.

If the vehicle-to-X communication module 20 or respectively other components of the vehicle-to-X communication in the vehicle 10 is/are to be checked, both the vehicle-to-X communication module 20 and the diagnostic device 30 are placed in a respective test mode.

In such a test mode, test messages can, by way of example, be emitted by the vehicle-to-X communication module 20 first by means of the first antenna 22 and received by the second antenna 32, so that they can be processed in the diagnostic device 30. In this case, it is then checked whether the received test messages comply with certain criteria or parameters. As a result, it is possible to conclude whether any errors are present.

If, by way of example, a field strength of the received test message is below a threshold, it can thus be concluded that an error is present in the transmitting amplifier 24 or in an antenna cable between the vehicle-to-X communication module 20 and the first antenna 22.

The test messages are, in particular, transmitted with differing power. Based on a measurement of the power of received test messages, it can be concluded that errors are present in a power regulation.

In addition, transmit spectral masks are created from the received test messages, wherein, as a function of the transmit spectral masks, errors in a radio chip can be detected. To this end, parameters such as packet error rates, modulation, data rates and packet contents are also evaluated. If an error is detected, this is displayed to a user of the diagnostic device 30 in a manner which is not shown in greater detail, by way of example via a display or via electronic communication.

The test messages are, in the present case, transmitted with a frequency of 20 Hz, i.e. 20 test messages are emitted per second. Such a value has proven itself for typical applications.

Following the test operation with a flow of messages from the vehicle-to-X communication module 20 to the diagnostic device 30, which has just been described, this flow of messages is reversed. That is to say, the diagnostic device 30 now emits test messages via the second antenna 32, which test messages are received by the first antenna 22. The vehicle-to-X communication module 20 then performs the same tests as described above with the received messages and can accordingly conclude that errors are present. By way of example, it can, in this case, be concluded from a field strength of the received test messages, which is below a threshold, that an error is present in the receiving amplifier 26. In this case, an error can also be present in an antenna cable between the vehicle-to-X communication module 20 and the first antenna 22.

The second antenna 32 may be executed as a hood over the first antenna 22. This is not shown in FIG. 1, but has proven itself for typical applications, since this prevents interference with the vehicle-to-X communication of vehicles located in the vicinity.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this can essentially, for example, take place within the framework of vehicle-to-vehicle communication, which typically takes place without the intermediary of a mobile network or a similar external infrastructure and which can therefore be distinguished from other solutions which, for example, are based on a mobile network. For example, vehicle-to-X communication can take place using the standards IEEE 802.11p or IEEE 1609.4. Vehicle-to-X communication can also be referred to as C2X communication. The sub-areas can be referred to as C2C (Car-to-Car) or C2I (Car-to-Infrastructure). The invention expressly does not, however, exclude vehicle-to-X communication with the intermediary of, for example, a mobile network.

It is further pointed out that configurations, features and variants of the invention, which are described in the various embodiments or embodiment examples and/or shown in the FIGURE, can be combined with one another as desired. Individual or multiple features are interchangeable as desired. Resulting combinations of features are understood to also be covered by the disclosure of this application.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for testing a vehicle-to-X communication module comprising:
    placing the vehicle-to-X communication module in a test mode;
    emitting a plurality of test messages from the vehicle-to-X communication module while in the test mode, test messages of the plurality of messages transmitted with differing power;
    receiving the test messages with a diagnostic device;
    analyzing the received test messages with the diagnostic device by:
        measuring power associated with the received test messages, and
        generating transmit spectral masks based on the received test messages; and
    detecting errors of the vehicle-to-X communication module based on the analyzed received test messages, wherein the errors include:
        power regulation error detected based on the measured power associated with the received test messages, and
        radio chip error detected based on a function of the transmit spectral masks.

2. The method according to claim 1, further comprising detecting an error of one of a transmitting amplifier and an antenna cable between the vehicle-to-X communication module and a vehicle antenna when a field strength of the received test messages is below a threshold.

3. A method for testing a vehicle-to-X communication module comprising:
placing the vehicle-to-X communication module in a test mode;
emitting a plurality of test messages from a diagnostic device during the test mode, test messages of the plurality of messages emitted with differing power;
receiving the test messages at the vehicle-to-X communication module;
analyzing the test messages at the vehicle-to-X communication module by:
measuring power associated with the received test messages, and
generating transmit spectral masks based on the received test messages; and
detecting errors of the vehicle-to-X communication module based on the analyzed received test messages, wherein the errors include:
power regulation error detected based on the measured power associated with the received test messages, and
radio chip error detected based on a function of the transmit spectral masks.

4. The method according to claim 3, further comprising detecting an error of one of a receiving amplifier and an antenna cable between the vehicle-to-X communication module and a vehicle antenna is detected, when a field strength of the received test messages is below a threshold.

5. The method according to claim 1, wherein the test messages are emitted with a predefined frequency.

6. The method according to claim 5, wherein the predefined frequency is between 15 Hz and 25 Hz.

7. The method according to claim 3, wherein errors are detected in a power regulation based on the measured powers of received test messages.

8. The method according to claim 3, wherein transmit spectral masks are created from the received test messages and as a function thereof errors are detected in a radio chip.

9. The method according to claim 3, wherein packet error rates, modulation, data rates and/or packet contents of the received test messages are analyzed and, as a function thereof, an error in a radio chip is detected.

10. The method according to claim 3, wherein detected errors are emitted to one of: the diagnostic device, vehicle electronics, a display and an external device.

11. The method according to claim 3, wherein the diagnostic device uses an antenna executed as a hood over a vehicle antenna in order to receive and/or transmit test messages.

12. The method according to claim 3, wherein the test messages are identified by a message format deviating from standard vehicle-to-X messages.

13. The method according to claim 3, wherein the message format is one of: a modified EtherType, a modified BTP port, and a predefined security certificate.

14. The method according to claim 3, wherein messages which have already been received or transmitted independently of the test mode are used as test messages.

15. A vehicle-to-X communication device having a controller with instructions, the instructions comprising:
placing the vehicle-to-X communication device in a test mode;
emitting a plurality of test messages from the vehicle-to-X communication module while in the test mode;
receiving the test messages at a diagnostic device;
analyzing the received test messages with the diagnostic device by:
measuring power associated with the received test messages, and
generating transmit spectral masks based on the received test messages; and
detecting errors of the vehicle-to-X communication module based on the analyzed received test messages, wherein the errors include:
power regulation error detected based on the measured power associated with the received test messages, and
radio chip error detected based on a function of the transmit spectral masks.

16. A diagnostic device configured to execute a method having instructions, the instructions comprising:
placing the vehicle-to-X communication module in a test mode;
emitting a plurality of test messages from a diagnostic device during the test mode;
receiving the test messages by at the vehicle-to-X communication module; and
analyzing the received test messages at the vehicle-to-X communication module by:
measuring power associated with the received test messages, and
generating transmit spectral masks based on the received test messages; and
detecting errors of the vehicle-to-X communication module based on the analyzed received test messages, wherein the errors include:
power regulation error detected based on the measured power associated with the received test messages, and
radio chip error detected based on a function of the transmit spectral masks.

17. The diagnostic device according to claim 16, wherein an error of one of a receiving amplifier and an antenna cable between the vehicle-to-X communication module and a vehicle antenna is detected, when a field strength of the received test messages is below a threshold.

* * * * *